United States Patent [19]
Jerman et al.

[11] Patent Number: 5,266,256
[45] Date of Patent: * Nov. 30, 1993

[54] EXTRUDER AND PROCESS MODIFYING RESIDENCE TIME DISTRIBUTION

[75] Inventors: Robert E. Jerman, S. Hampton, Pa.; Jeffrey L. Daecher, Sicklerville; Glenn W. Miller, Cherry Hill, both of N.J.

[73] Assignee: Rohm and Haas Company, Philadelphia, Pa.

[*] Notice: The portion of the term of this patent subsequent to Sep. 10, 1993 has been disclaimed.

[21] Appl. No.: 17,717

[22] Filed: Feb. 16, 1993

[51] Int. Cl.⁵ .............................................. B29C 47/64
[52] U.S. Cl. .............................. 264/211.24; 264/349; 366/82; 366/84; 366/136; 425/204; 425/208
[58] Field of Search ......... 264/211.24, 211.21–211.23, 264/349, 176.1; 425/204, 208, 209, 203, 382.4; 366/85, 84, 136, 82

[56] References Cited

U.S. PATENT DOCUMENTS

| | | |
|---|---|---|
| 2,458,068 | 1/1949 | Fuller . |
| 3,642,752 | 2/1972 | Sutter ................................ 425/203 |
| 4,863,363 | 9/1989 | Haring ........................... 264/211.23 |
| 4,900,156 | 2/1990 | Bauer ................................. 425/204 |
| 4,948,859 | 8/1990 | Echols et al. .................. 264/211.24 |
| 5,047,188 | 9/1991 | Okada et al. .................. 264/211.24 |
| 5,056,925 | 10/1991 | Klein . |
| 5,205,973 | 4/1993 | Kafka .................................. 264/101 |

FOREIGN PATENT DOCUMENTS 0370735  5/1990  European Pat. Off. ........ 264/211.23

OTHER PUBLICATIONS

"Twin-Screw Geometry a Key to Reactive Extrusion", Tucker et al, *Plastics Engineering*, May 1987, pp. 27–30. Altered Screw flight Profile Creates Backflow, Accelerating Melting in Extruders, Plastics Focus, Mar. 22, 1993, p. 5, Fred Hoth, Scientific Process & Research, Inc. 67 Veronica Avenue, Somerset, N.J. 08873, 908-846-3477.

*Primary Examiner*—Jeffery Thurlow
*Attorney, Agent, or Firm*—Jordan J. Driks

[57] ABSTRACT

A process is provided for modifying the residence time distribution of materials in an extruder which results in a residence time distribution comparable to that obtained in a continuous stirred tank reactor. An extruder is provided which has a section which modifies the residence time distribution of materials loaded into the extruder.

8 Claims, 2 Drawing Sheets

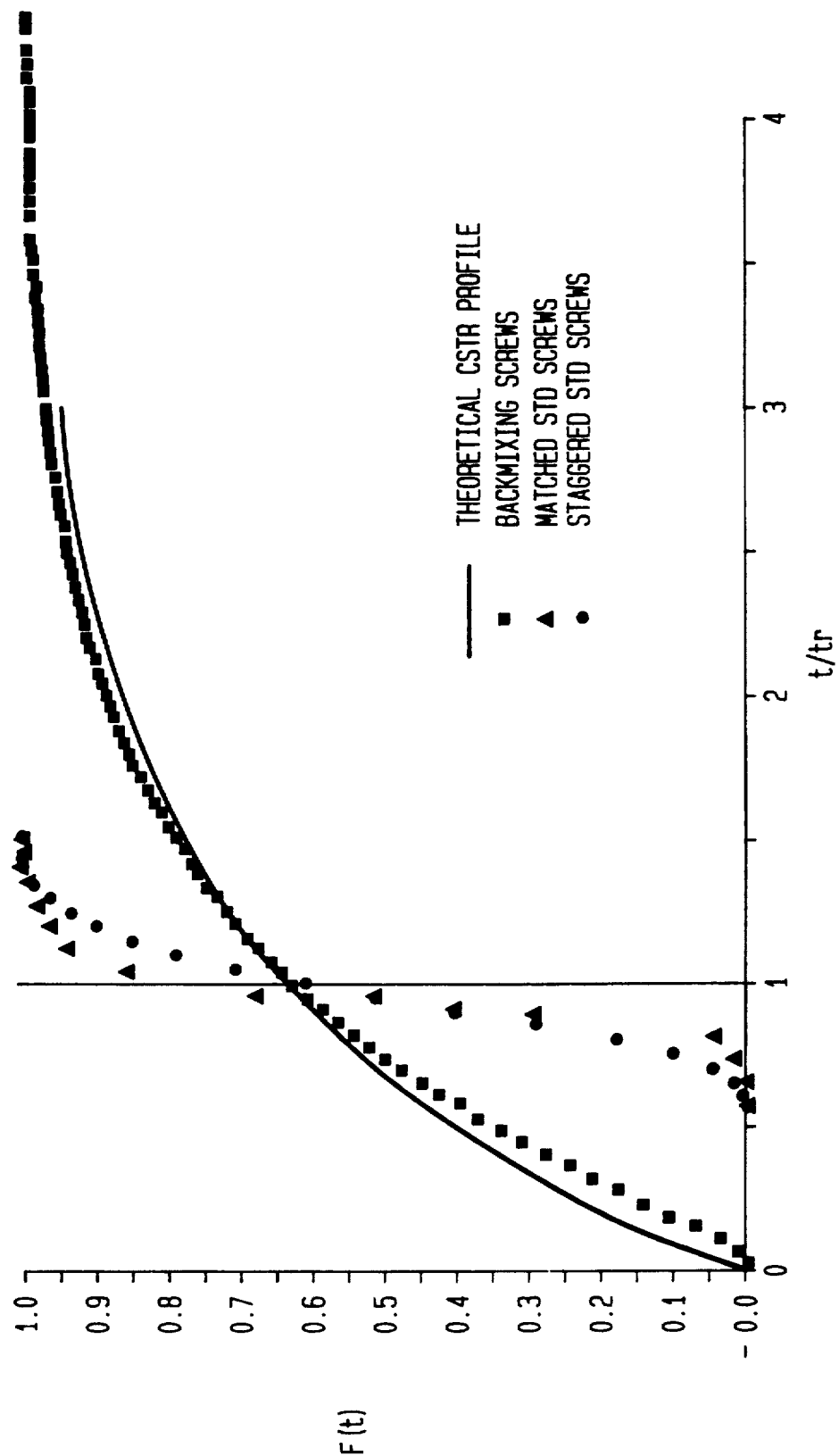

EXTRUDER AND PROCESS MODIFYING RESIDENCE TIME DISTRIBUTION

This invention relates to extruders. More particularly, this invention relates to a novel screw design for extruders. This invention also relates to a process for conducting mixing or reactions in an extruder in which a residence time distribution is obtained which is substantially the same as would be obtained in a continuous stirred tank reactor.

Single and twin screw extruders have been experiencing use as reactors for various fluids and polymer systems. The reactions which have been conducted within the extruder range from controlled degradation reduction of molecular weight of a polymer, to grafting reactions or side group modifications and in-situ polymerizations.

An important variable when using an extruder as a reactor is the mean residence time and the residence time distribution of the materials within a selected section of an extruder. The mean residence time is the average time, of all fluid materials, spent in a particular section of the extruder or of any process vessel. The residence time distribution is the distribution of residence times about the mean which each fluid material spends in the extruder or process vessel.

Generally, extruders have been used in connection with reactions or operations which do not require a residence time distribution similar to that which would be obtained in a continuous stirred reactor. For example, in a polycondensation reaction, molecular weight build-up is achieved by the gradual coupling of A-B type monomeric units into dimers, trimers, and the like. Molecular weight is achieved by the coupling of two smaller chains to form one larger one. In this case, such polycondensation reaction favors a plug flow distribution because in a plug flow distribution, there is no back-mixing and instead, the material which enters the extruder first also leaves the extruder first. Thus, in a polycondensation reaction, a plug flow distribution would prevent the established chains from mixing with fresh monomer and instead, would allow the chains to couple and build molecular weight.

There are however, certain types of reactions for which back-mixing is considered critical in order to obtain the desired product. For example, when one polymerizes methyl methacrylate to obtain poly (methyl methacrylate), (a free radical reaction) it is important that the molecular weight of the polymer be built and that the molecular weight distribution be narrow. As an initiated polymer chain begins to grow, it requires a constant fresh supply of monomer in order to build the molecular weight. This of course is unlike a polycondensation reaction which requires the coupling of dimers, trimers, and the like. In a plug-flow type of arrangement in an extruder, there would be no or little opportunity for fresh monomer to come into contact with the initiated polymer chain in order to continue to build its molecular weight. Instead, the initiated chains would continue through the extruder while fresh monomer would be added to the entry point to the extruder and would initiate to form other initiated chains of small molecular weight. There would be little opportunity for fresh monomer to add to already initiated chains in order to build molecular weight.

For this reason, free polymerizations, such as that of methyl methacrylate, are generally conducted in a continuous flow-stirred tank reactor. In this way, the residence time distribution allows for the addition of fresh monomer to the initiated polymer chain.

U.S. Pat. No. 2,458,068 is directed to a system for the treatment of material wherein gas, liquids and solids, which have been mechanically combined in an extruder, are separated from one another and the solids exit from the extruder in a desired shape for further processing. In order to conduct the separation of the mechanically combined gas, liquids and solids, the pitch of one of the flights of one of the twin screw counter rotating, non-intermeshing screws within the barrel of the extruder is reversed so that the normal herringbone configuration, which is seen in a normal non-intermeshing twin screw extruder does not exist and instead, the flights of one of the screws is reversed so as to create a back pressure which will expel liquid from the mixture while the solid material is transferred, near the inlet to the reverse flight, and is expelled from the extruder in the normal manner.

The '068 patent does not disclose altering the residence time distribution, or increasing screw to screw mixing.

It is an object of this invention therefor, to provide a process for conducting reactions, which require extended mean residence times, in an extruder.

Another object of this invention is to provide a process for conducting a free radical polymerization in an extruder.

A further object of this invention is to provide a process for polymerizing methyl methacrylate in an extruder.

Still a further object is to provide an extruder capable of a residence time distribution, for material, which is consistent with the residence time distribution of a continuous stirred tank reactor.

An additional object of this invention is to provide an extruder wherein back-mixing of reactants is achieved by reversing the flights of one of the screws in a mixing or reaction segment of a counter rotating non-intermeshing twin screw extruder.

Other objects and advantages will become apparent from the following more complete description and claims.

BRIEF DESCRIPTION OF THE DRAWINGS

In the drawing,

FIG. 2 is a graph which compares the residence time distribution obtained by the process of this invention using the extruder with a prior art process and a prior art extruder.

In FIG. 2, F(t) is the cumulative residence time distribution. This represents the "time after which a certain percentage of material in the vessel has left." For example, in FIG. 2, it is seen that at a reduced time of 1, 0.67(or 67%) of the material has left the vessel (or 67% of the material has a residence time shorter than 1). The legend t/tr is a dimensionless time, and represents the real time divided by the average or mean residence time. For example, a vessel may have a mean residence time of five minutes. According to FIG. 2, 67% of the fluid material in the vessel has a residence time shorter than five minutes. A value of t/tr equals four would be equivalent to a real time of 20 minutes (20/5=4). In FIG. 2, "CSTR" means continuous stirred tank reactor.

SUMMARY OF THE INVENTION

Figure 1:
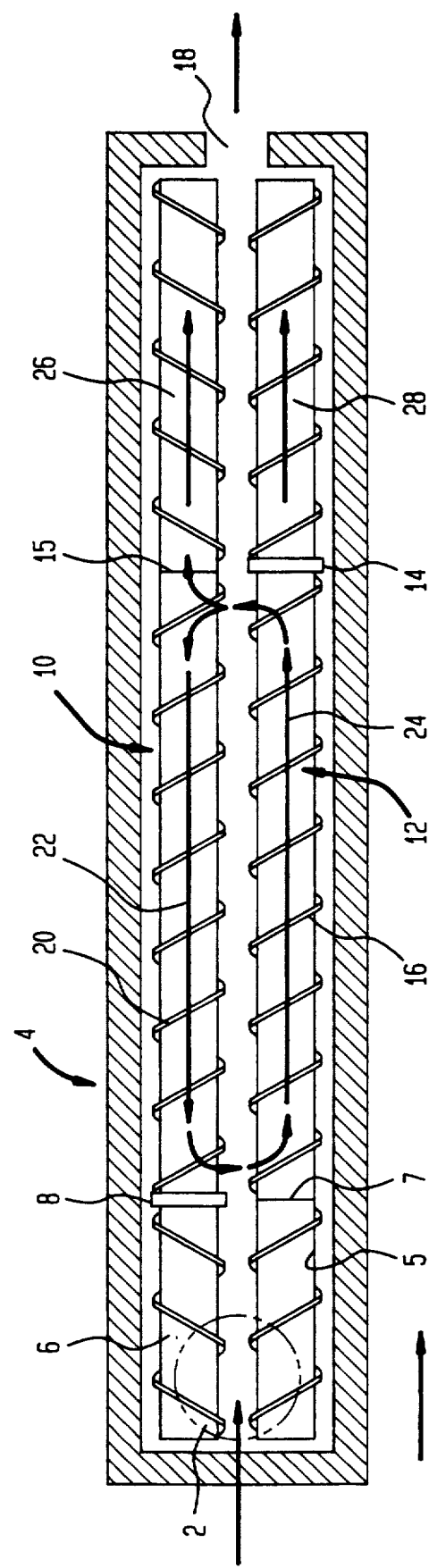
FIG. 1 is a cross-sectional top view of an extruder of the present invention. One possible direction for the flow of material in the extruder is shown by the arrows in the mixing and discharge sections of the screws.

This invention contemplates a process for increasing the mean residence time of materials in the reaction or mixing zone of an extruder comprising the steps of feeding materials into the reaction or mixing zone of an extruder, having twin non-intermeshing counter rotating screws arranged parallel or tangential to one another and an entrance inlet for the introduction of materials and a discharge outlet, remote from the entrance inlet, for removing materials, rotating said twin screws with the same directional pitch, moving material along one of the screws in a direction, from an area proximate the discharge outlet toward the entrance inlet, transferring material to the second screw and discharging material from said reaction or mixing zone through said discharge outlet.

This invention also contemplates an extruder which has an inlet for the introduction of material into the extruder and an outlet for the discharge of material from the extruder and which also has counter rotating non-intermeshing twin screws which have flights thereon and which are disposed substantially parallel or tangential to one another, and means connected operably to the screws for turning the screws during the operation of the extruder, wherein the residence time distribution for the materials in the extruder, is improved by the flights of each of the screws in the reaction or mixing zone having the same directional pitch.

In practicing the process of this invention, reactants, such as methyl methacrylate and an initiator, are fed through an inlet 2 into the extruder 4. In the feed section proximate the inlet 2, which comprises the area prior to the compounder 8 and junction 7, the materials are moved forward by both screw sections 5 and 6 of screws 10 and 12. The materials are then conveyed by means of the screw 12 toward the compounder 14 which is proximate the discharge outlet 18 of the extruder 4. Each of the flights 16 of the screw 12 which conveys material toward the discharge end has a low and high pressure region. The pushing faces of the flight 16 of the screw 12 creates a high pressure region and the trailing face of the screw creates a low pressure region. The flights of the screw 12 are filled with material downstream of junction 7 and the compounder 8 which restricts the flow of material and forces material to screw section 5. Some material may flow past compounder 8, depending on the size of compounder 8. When the material in the screw 12 reaches the compounder 14, because of the restriction on the passage of material past the compounder 14 the bulk of the flow of material is directed toward the junction 15 between screw section 22 and screw section 26. The relative position of the junction 15 to the compounder 14 and the size of the compounder 14 determines the amount of backflow and forward flow. In like manner, the pushing face of flights 20 of the screw 10 creates a high pressure zone and the trailing face creates a low pressure zone. As is readily apparent, the high pressure and low pressure areas will alternate as the screws turn.

The screw 10, which has flights 20 which have the same directional pitch as the forward moving screw 12, has a high pressure area at the pushing face of the flight 20 and a low pressure area at the trailing face. Because the screw 10 is moving material toward the inlet 2, the high pressure area of the screw 10 will be proximate the low pressure area of the forward moving screw 12. Because of the difference in pressure, material is constantly being transferred from the forward moving screw section 24 of screw 12 to the back mixing screw section 22 of screw 10 and from section 22 of screw 10 to section 24 of screw 12. The effect of the above is not only to enable material to transfer freely between screw sections 22 and 24, but also to enable material, which has traveled the length of screw section 24, to return to screw section 22 and to be back mixed along the length of screw section 22. This ultimately brings a portion of that material to compounder 8 and subsequent transfer to screw section 24 proximate junction 7 for movement of material toward compounder 14. This transfer of the material results in a residence time distribution in the mixing zone (which may also be a reaction zone) defined by screw sections 22 and 24, which results in a residence time distribution consistent with the residence time distribution of a continuous stirred tank reactor.

It should be understood that there will be some material which will be transferred from the forward moving screw section 24 to the backward moving screw section 22 and some material which will not be transferred and will be transported from screw sections 22 and 24 to the forward feeding discharge screw portions 26 and 28 of the screws 10 and 12 and thereafter extruded through the discharge outlet 18.

The compounder 8 on the screw 10 which moves material toward the inlet 2, serves to create a restriction on the flow of material so that the material and the transfer of reactants from the screw section 22 to the screw section 24 is encouraged to move forward toward the discharge outlet 18.

The compounder 14 on the forward moving screw also serves to create a restriction condition which encourages the transfer of material from the forward moving screw section 24 to the screw section 22 moving material in the direction of the inlet 2. It will also encourage material to move past the compounder 14 toward the discharge outlet 18 and from the backward moving screw section 22 to convey material toward the discharge outlet 18 as well as material toward the compounder 8.

The compounders may be of different diameters and/or different lengths to provide different degrees of restriction on the flow of materials. Additional compounders may be provided at junctions 7 and 15. These additional compounders may be the same or different diameters and/or lengths as compounders 8 and 14.

Instead of compounders, other devices may be attached to sections of each screw to create a flow restriction. For example, the compounders may be made of threaded members (not shown) which would restrict the flow of material.

The screw sections may be joined together by any suitable connecting means (not shown) such as threaded male and female members at the ends of each screw section where the joining is to take place.

In addition to reactions which are generally carried out in an extruder, other reactions may be carried out in the extruder of this invention which require extended mean residence times. For example, because of the increased mean residence time, one may conduct free radical reactions such as the polymerization of methyl methacrylate at a temperature of between about 100° C. to about 200° C. using an initiator and a chain transfer agent and the preparation of a graft or block copolymer, such as by reacting polypropylene with an acrylate or methacrylate at a temperature of from about 170° C. to about 260° C. using an initiator. Additionally reactions such as the imidization of polymethacrylate at a temperature of from about 200° C. to about 450° C. using ammonia or a primary amine may be carried out.

In order to more fully illustrate the nature of this invention and the manner of practicing the same, the following examples are presented.

EXAMPLE 1

The apparatus used in Example 1 is the same as that shown in FIG. 1 and described in the specification. An additional compounder is provided at each of junctions 7 and 15 to restrict and direct the flow of material. In addition, three feed ports are provided at regularly spaced intervals and along the length of the reaction zone which has the back mixing screw section 22. These feed ports are for the purpose of injecting a dye concentrate in order to measure the residence time distribution.

Polybutene is fed into the extruder through the inlet port at a rate of 7.9 grams per minute and the screws are caused to rotate in a counter rotating manner at sixty revolutions per minute. A p-Naphtholbenzein dye concentrate is injected into the port provided in the reaction zone which is nearer the feed inlet 2. The temperature in the reaction zone is ambient during the mixing. The dye concentrations exiting the extruder are measured as a function of time and the results are plotted on a curve, represented as FIG. 2, with a plot of the theoretical mixing which would be obtained if the mixing had been conducted in a continuous flow stirred tank reactor (CSTR).

The cumulative residence time distribution for the back mixing screw is very close to the mixing obtained in an ideal stirred tank reactor, i.e. a continuous flow stirred tank reactor.

EXAMPLE 2

In order to demonstrate the efficacy of the process and extruder of this invention, Example 1 is repeated except that the extruder used for Example 2 does not have a back-mixing screw in the reaction zone and does not have isolating compounders. The screws in the mixing zones of the extruder used for Example 2 both operate in an opposite directional pitch to one another. The extruder is operated so that the screws in the reaction zone of the extruder have the flights matched to one another, in a V configuration and, in another embodiment, have the flights of the screws in a staggered configuration to one another.

The results are set forth in FIG. 2. FIG. 2 includes the results from Example 1.

As will be seen from FIG. 2, the extruder of Example 1, which has a back mixing screw section, gives a user a residence time distribution which is substantially the theoretical profile obtained with a continuously stirred tank reactor. When the back mixing screws are not provided, the residence time distribution is substantially that obtained through plug-flow and not that of a continuous stirred tank reactor.

EXAMPLE 3

A 0.8 inch non-intermeshing, counter rotating twin screw extruder is used for this example. The extruder generally conforms to the extruder of FIG. 1 except that there is a vented twin-screw barrel section downstream of the back mixing screw section which is in the reaction zone defined by the back mixing screw section and the other screw section. The reaction zone is 22.8 inches long. Three pressure probes, for the purpose of monitoring the pressure profile, are placed in the reaction zone of the extruder. The first pressure probe is placed near the point of introduction of the feed. The second pressure probe is placed in the reaction zone downstream of the first pressure probe and the third pressure probes is downstream of the second pressure probe. The reactants are preheated to 110° C. prior to injection into the reaction zone. The monomer mixture used consists of 99.6 wt. % methyl methacrylate; 0.2 wt. % initiator; and 0.2 wt. % chain transfer agent. The extruder is run for eight hours. The monomer mix feed rate is 60 ml./minute. The temperature in the reaction zone of the extruder is 140° C. The pressure readings for the probes are as follows: for the first probe 80 psig; for the second probe 95 psig; and for the third probe 100 psig. The screw speed is 150 revolutions per minute.

The poly(methyl methacrylate) production rate is 21.2 grams per minute and the conversion of monomer to polymer in the exit stream is 37.6 wt. %. The weight average molecular weight of the poly(methylmethacrylate) is 62,500. The number average molecular weight of the poly(methylmethacrylate) is 25,600 for a polydispersity of 2.44.

While this invention has been described in terms of certain preferred embodiments and illustrated by means of specific examples, the invention is not to be construed as limited except as set forth in the following claims.

We claim:

1. A process for modifying the mean residence time and residence time distribution of materials in a reaction or mixing zone of an extruder, having twin non-intermeshing counter rotating screws arranged parallel or tangential to one another and an entrance inlet for the introduction of material and a discharge outlet, remote from the entrance inlet, for removing materials, rotating said twin screws with the same directional pitch, restricting the flow of material from the reaction or mixing zone toward the discharge outlet and from the reaction or mixing zone toward the entrance inlet, moving material along one of the screws in a direction, from an area proximate the discharge outlet toward the entrance inlet, transferring material to the second screw and discharging material from said reaction or mixing zone through said discharge outlet.

2. A process according to claim 1, wherein the reaction conducted in the extruder is a free radical reaction.

3. A process according to claim 1, wherein the reaction conducted in the extruder is a grafting or block reaction.

4. A process according to claim 1, wherein the reaction conducted in the extruder is the polymerization of methyl methacrylate.

5. A process according to claim 1, wherein the reaction conducted in the extruder is the imidization of a polymethacrylate.

6. In an extruder having an inlet for introduction of material into said extruder and an outlet for discharge of material from said extruder and counter rotating non-intermeshing twin screws having flights thereon and disposed substantially parallel or tangential to one another and means connected operably to the screws for turning the screws during operation of the extruder, a portion of said screws defining a reaction or mixing zone within the extruder, and flow restriction means present on at least one screw at the beginning and end of the reaction or mixing zone, the improvement comprising the flights of each of the screws in the reaction or mixing zone having the same directional pitch whereby the residence time distribution and mean residence time are modified.

7. An extruder according to claim 6 wherein a compounder is present on at least one screw at the beginning and end of the reaction or mixing zone.

8. An extruder according to claim 7 wherein the compounder at the beginning of the reaction or mixing zone is on a different screw than the compounder at the end of the reaction or mixing zone.

* * * * *

UNITED STATES PATENT AND TRADEMARK OFFICE
CERTIFICATE OF CORRECTION

PATENT NO. : 5,266,256
DATED : November 30, 1993
INVENTOR(S) : Robert E. Jerman, Jeffrey, L. Daecher, Glenn W. Miller It is certified that error appears in the above-indentified patent and that said Letters Patent is hereby corrected as shown below:

On the title page: Item [*] Notice after "Date of Patent" and before "November 30, 1993".

Item [73] Assignee:

please delete "[*] Notice: The portion of the term of this patent subsequent to Sep. 10, 1993 has been disclaimed."

Signed and Sealed this

Sixteenth Day of May, 1995

Attest:

BRUCE LEHMAN

Attesting Officer                Commissioner of Patents and Trademarks